United States Patent [19]
Schnitzius et al.

[11] Patent Number: 5,275,386
[45] Date of Patent: * Jan. 4, 1994

[54] POSITIONING DEVICE

[75] Inventors: Klaus Schnitzius, Rheinbrohl; Ulrich Baum, Koblenz; Castor Fuhrmann, Brachtendorf, all of Fed. Rep. of Germany

[73] Assignee: Stabilus GmbH, Koblenz-Neuendorf, Fed. Rep. of Germany

[*] Notice: The portion of the term of this patent subsequent to Oct. 27, 2009 has been disclaimed.

[21] Appl. No.: 930,725

[22] Filed: Aug. 14, 1992

Related U.S. Application Data

[62] Division of Ser. No. 624,707, Dec. 6, 1990, Pat. No. 5,158,268.

[30] Foreign Application Priority Data

Dec. 12, 1989 [DE] Fed. Rep. of Germany ....... 3940916

[51] Int. Cl.⁵ ............................ F16F 5/00; F16F 9/32; F16F 9/44
[52] U.S. Cl. ............................ 267/64.12; 267/64.26; 267/120; 188/300
[58] Field of Search ............ 188/300, 67, 322.17, 188/322.12, 322.19; 267/64.12, 64.11, 120, 64.13, 64.26; 92/13, 13.4, 13.6

[56] References Cited

U.S. PATENT DOCUMENTS

| | | | |
|---|---|---|---|
| 2,349,244 | 5/1944 | Brown | 188/300 X |
| 4,867,317 | 9/1989 | Wildemann et al. | 267/64.11 X |
| 5,215,291 | 6/1993 | Bauer et al. | 267/120 |

Primary Examiner—Robert J. Oberleitner
Assistant Examiner—Peter M. Poon
Attorney, Agent, or Firm—Brumbaugh, Graves, Donohue & Raymond

[57] ABSTRACT

According to an illustrative example of the invention, a gas spring is combined with a telescopic tube which is axially slidable on the cylinder of the gas spring. The piston rod and the telescopic tube are provided at the respective most remote ends thereof with fastening eyes. The telescopic tube can be fixed in a plurality of positions with respect to the cylinder. For such fixation, the cylinder is connected with a carrier within the telescopic tube between opposite end walls of the cylinder and the telescopic tube. A locking bolt is guided within the carrier in a direction transverse to the axis of the telescopic tube. The locking bolt is engageable with a corresponding plurality of openings in the telescopic tube. The locking bolt is biased by a spring into an engagement position with respect to a respective opening and can be released from such engagement by being inwardly pressed by an operator.

11 Claims, 3 Drawing Sheets

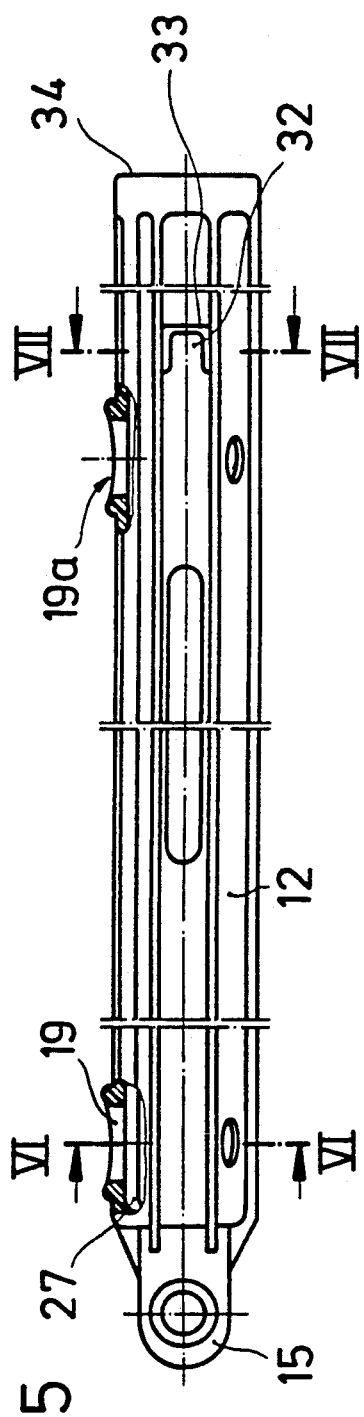
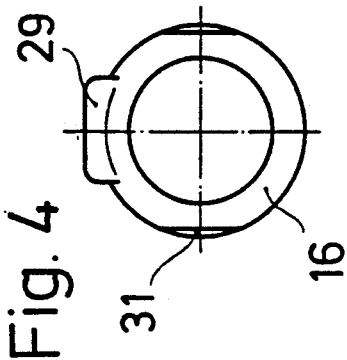
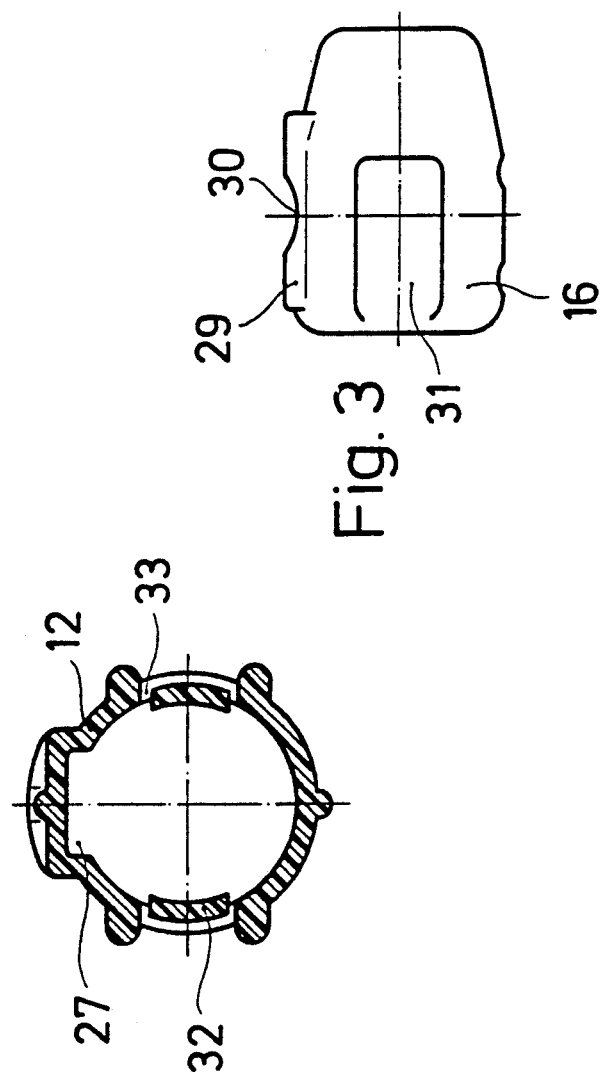

POSITIONING DEVICE

This application is a division of application Ser. No. 07/624,707, filed on Dec. 6, 1990 now U.S. Pat. No. 5,158,268.

BACKGROUND OF THE INVENTION

This invention relates to a positioning device for positioning an engine bonnet or a boot lid of a motor vehicle. Such positioning devices are commonly in use and comprise primarily a gas spring, which gas spring assists a lifting movement of the respective engine bonnet or boot lid. Alternatively, the gas spring is replaced by a so-called oil support, which is also a cylinder piston device and has a primary function of maintaining the engine bonnet or boot lid in a raised position. Frequently, the gas spring or oil support has only a limited stroke, such that the bonnet or boot lid can only be positioned in a normal opening position which is sufficient for normal loading of the luggage space of the motor vehicle and for performing normal service steps at the engine. Sometimes it is necessary, however, to open the engine bonnet or boot lid beyond said normal opening position, e.g. if the engine is to be removed from the motor vehicle. For allowing such further opened position of the boot lid or engine bonnet, it is known to provide a telescopic tube on the cylinder of the gas spring or oil support. This telescopic tube can be moved with respect to the cylinder and locked with respect to the cylinder in a position corresponding to said further opened position of the engine bonnet or boot lid.

STATEMENT OF THE PRIOR ART

From German Offenlegungsschrift 34 33 735 a positioning device is known, which comprises a gas spring and a telescopic tube slidingly movable on the cylinder of the gas spring. For locking the telescopic tube with respect to the cylinder of the gas spring in a predetermined position, a locking member is pivotably mounted on the telescopic tube about a diagonal axis thereof. By pivoting this locking member, the locking member can be selectively moved between locking position and an unlocking position with respect to the cylinder. The locking member is provided on the outer side of the telescopic tube. The total dimensions of the telescopic tube are increased by the locking member. The aesthetic appearance of the total device is negatively influenced. There is a risk that the operator might injure his hands when handling the locking device.

OBJECT OF THE INVENTION

One object of the present invention is to provide a positioning device in which the locking member can be accommodated within the telescopic tube without substantially increasing the dimensions thereof and particularly without increasing the cross-sectional dimensions of the positioning device.

A further object of the present invention is to provide a positioning device which can be locked in a plurality of positions and more particularly in a first relative position of a minimum length corresponding to the normal opening position of the engine bonnet or boot lid and in a second position corresponding to an extreme opening position of the engine bonnet and the boot lid, respectively.

Further objects of the inventions are to provide a positioning device of simple and economic design and of easy operability.

SUMMARY OF THE INVENTION

A positioning device is intended for positioning two relatively movable construction elements in respective relative positions. This positioning device comprises a cylinder piston unit. This cylinder piston unit has a first member, namely a cylinder member, with an axis and two ends, and a second member, namely a piston rod member, axially extending through one of said two ends. The positioning device further comprises a telescopic tube axially movably guided on one of said first and second members. The telescopic tube is axially lockable with respect to said one member by releasable locking means. The telescopic tube is provided with first fastening means for being fastened to one of said construction elements. The other one of said first and second members is provided with second fastening means for being fastened to the other one of said construction elements.

The releasable locking means comprise a locking element axially fixed with respect to said one of said first and second members and at least one locking catch means axially fixed with respect to said telescopic tube. The locking element is engageable into and disengageable from said locking catch means by respective movements with respect to said one member substantially transverse to said axis.

As the locking element is axially fixed with respect to the respective first or second member, it can be easily accommodated within the telescopic tube so that the locking element is protected against being damaged in use and cannot injure the operator. The locking element can be housed between respective opposite ends of the cylinder and of the telescopic tube so that the diameter of the positioning device is not increased by the presence of the locking element. The locking catch means can be provided at any location along the length of the telescopic tube so that various relative positions of the respective member and the telescopic tube can be selected for locking engagement.

The locking element may be biased by a spring force towards engagement with the locking catch means and may be releasable from engagement with the locking catch means by an operator. So, the operability of the positioning device is very easy.

The locking catch means may be provided by a substantially radially directed opening of the telescopic tube. Such a catch means can be provided in a very simple and economic way.

The locking element is preferably non-rotatable with respect to the locking catch means. So, the operability is very easy, because there is no need for searching the respective position of locking engagement, e.g. the locking element is axially guided by a guiding groove provided on an internal face of said telescopic tube.

According to a preferred embodiment, the locking element is substantially radially guided within a carrier fastened to said one member. The carrier and the locking element may be manufactured by conventional techniques, such as injection moulding of plastic or metal.

The carrier may be fastened to said one member at one end thereof which first enters into said telescopic tube, when assembling said cylinder piston unit and telescopic tube. So, the carrier is always accommodated within the telescopic tube, irrespective of the relative position.

The carrier may be fastened to an axially extending fastening pin of said one member. Such a fastening pin is always available on conventional gas springs and oil supports of series production for providing a fastening eye or the like, when the gas spring or oil support is used without a telescopic tube. Therefore, it is possible to use conventional gas springs and oil supports with one slight, if any, modifications.

The carrier may be axially guided within the telescopic tube by the internal surface thereof.

The carrier may be non-rotatably guided within the telescopic tube. This makes sure that even during disengagement of the locking element and the catch means, relative rotation of the telescopic tube and the respective member is inhibited. Accordingly, no situation can occur in which locating the correct relative position for engagement presents difficulties, e.g. the carrier may have a projection engaging into a substantially axially extending guiding groove provided at an internal surface of the telescopic tube. This projection remains in engagement with the groove, even when the locking element is out of engagement with the respective catch means.

The locking element may be substantially radially guided within a substantially radially extending guiding bore of the carrier. This facilitates easy manufacturing of both the locking element and the carrier.

The locking element may be biased towards engagement with the locking catch means by spring means located within the guiding bore. The spring means may be supported by a bottom face of the guiding bore and act onto an inner end face of the locking element located within the guiding bore. This again facilitates manufacturing.

The locking element may be provided with snap means snappingly engaging snap shoulder means, when said locking element is inserted into said guiding bore. These snap means and snap shoulder means define an engagement position of the locking element within the guiding bore, in which engagement position said locking element engages said locking catch means.

The telescopic tube may be provided with radially inwardly biased spring tongues engaging an external face of said one member. These spring tongues prevent radial wobbling of the telescopic tube with respect to the member engaged thereby. Moreover, the axial movement of the telescopic tube with respect to the respective member is damped. Such damping may be of advantage, if e.g. a strong wind force acts onto the engine bonnet or boot lid during relative movement of the telescopic tube and the respective member. The spring tongues may be distributed about the axis.

The carrier may be in screw engagement with the respective member. In such case, the carrier may be provided with at least one key surface for applying a screwing tool. So, the assembling of the positioning device is considerably facilitated.

According to a preferred embodiment, said one member is the cylinder member. Alternatively, it is, however, possible to provide the telescopic tube on the piston rod member.

First locking catch means may be provided on the telescopic tube at a location corresponding to a most inward position of said one member within said telescopic tube; the second locking catch means may be provided on the telescopic tube at a location corresponding to a most outward position of the respective member within the telescopic tube.

The invention further relates to a positioning device for positioning two relatively movable construction elements in respective relative positions. Again, the positioning device comprises a cylinder piston unit. The cylinder piston unit has a first member, namely a cylinder member, with an axis and two ends, and a second member, namely a piston rod member, axially extending through one of said two ends. A telescopic tube is axially movably guided on one of said first and second members. This telescopic tube is axially lockable with respect to said one member by releasable locking means. The telescopic tube is provided with first fastening means for being fastened to one of said construction elements. The other one of said first and second members is provided with second fastening means for being fastened or connected to the other one of said construction elements.

The releasable locking means are adapted for axially locking said telescopic tube with respect to said one member in a plurality of axially spaced relative positions.

The cylinder piston unit may preferably be a gas spring, which simultaneously helps to lift the bonnet or boot lid.

Alternatively, the cylinder piston unit may be a so-called oil support, which does not provide a lifting force, but helps to locate the engine bonnet or boot lid in a desired normal opening position.

In case of a gas spring, the piston rod member of said gas spring may be axially biased with respect to the cylinder member towards an outermost position by a volume of pressurized gas.

By the term "relatively movable construction elements" one may understand e.g. a framework of a motor vehicle on the one hand and an engine bonnet or boot lid on the other hand.

With the positioning device of the present invention, when providing a plurality of locking catch means, the relative position of the telescopic tube with respect to the respective member is always locked in both directions. Thus, it is warranted that the boot lid or engine bonnet can never be moved by heavy wind conditions towards a position in which the sliding engagement of the cylinder piston device and the telescopic tube is lost.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to an embodiment shown in the accompanying drawings in which

FIG. 3 is a detailed view of a carrier of the locking element;

FIG. 4 is a front view of the carrier according to FIG. 3;

FIG. 5 is a side view of a telescopic tube with catch openings and spring tongues;

FIG. 6 shows a section through the telescopic tube according to line VI—VI of FIG. 5;

DETAILED DESCRIPTION OF THE PREFERRED EMBODIMENT

Figure 1:
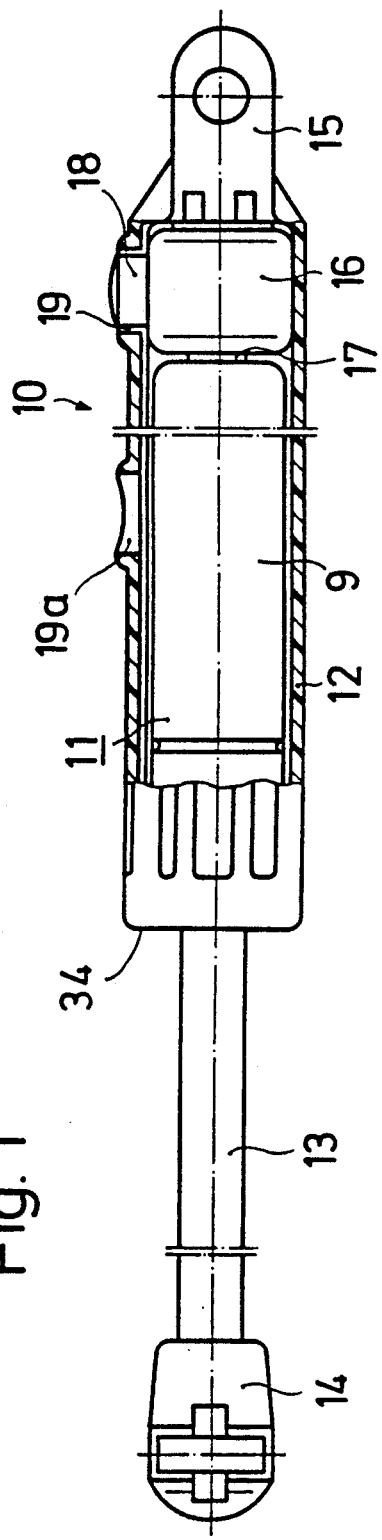
FIG. 1 shows a positioning device with a gas-filled spring which is longitudinally displaceable in an outer tube and can be locked in various catches adapted to engage a connecting element.

The positioning device 10 shown in FIG. 1 consists essentially of a gas-filled spring 11, which is disposed with its cylinder 9 for longitudinal displacement in a telescopic tube 12. The gas-filled spring 11 comprises a piston rod 13 which at its left-hand end is provided with a piston rod articulation 14. The telescopic tube 12 is open at one end. The piston rod 13 of the gas-filled spring 11 extends out of the open end, while at the closed end of the telescopic tube 12 there is a fixing lug 15 for attachment to the vehicle.

Figure 2:
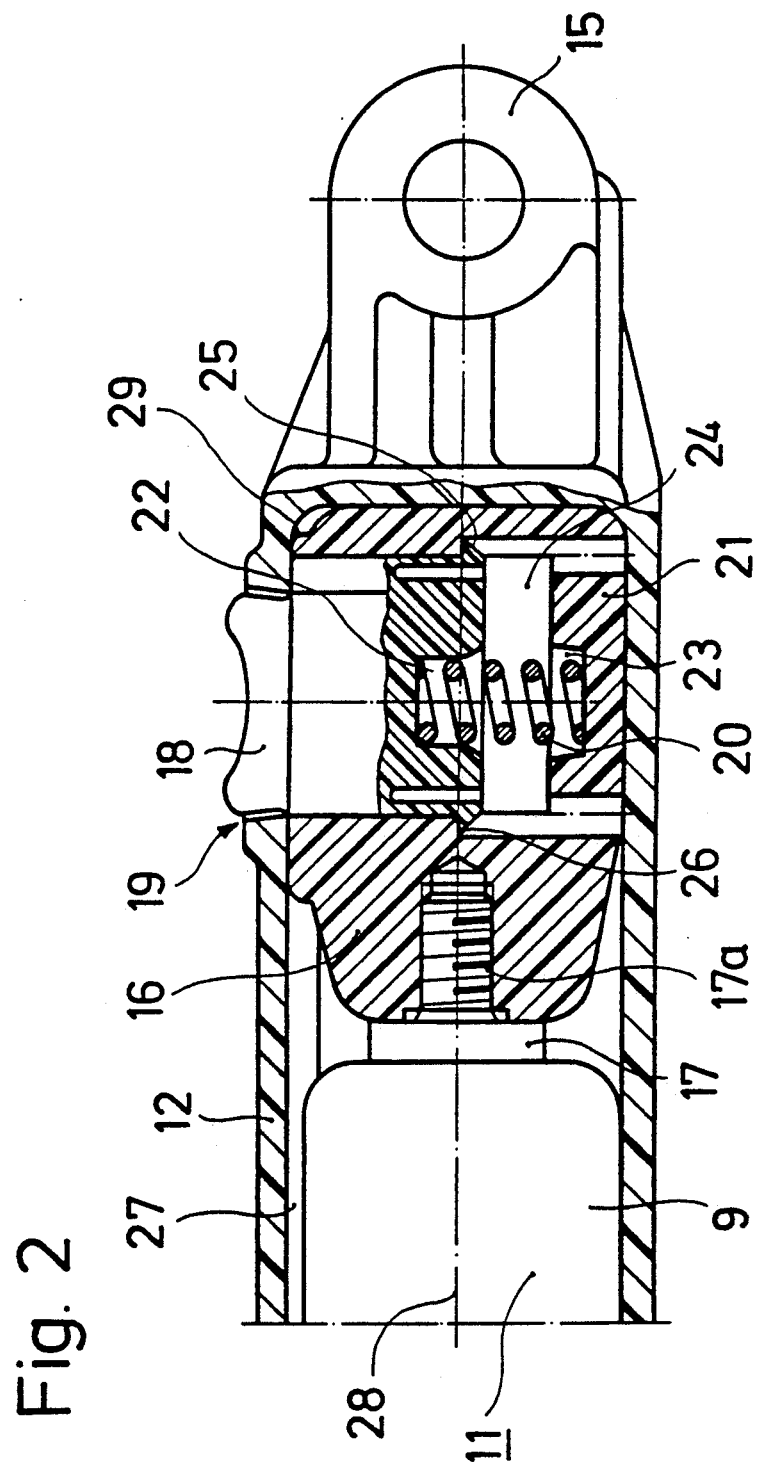
FIG. 2 is a detailed view of a locking element associated with a gas spring with the connecting element engaging a catch opening of a telescopic tube.

On the side remote from the piston rod 13, the cylinder 9 is connected by a connection 17 to a carrier 16. As FIG. 2 shows in detail, the connection 17 comprises a screw pin 17a by which it is screwed into the carrier 16. The carrier 16 comprises a locking element 18, e.g. a bolt, which is adapted for movement transversely to the longitudinal axis 28 of the telescopic tube 12 against the pressure of a spring 20. To this end, the carrier 16 has a bottom 21 in which there is a bottom spring mounting bore 23. The locking element 18 comprises an upper spring mounting bore 22 which is aligned with the bottom spring mounting bore 23. The spring 20 is constructed as a coil thrust spring and is fixed in the spring mounting bores 22 and 23. Between the bottom 21 and the locking element 18 there is a clear space 24 by which the locking element 18 can move transversely to the longitudinal axis 28 of the telescopic tube 12.

The telescopic tube 12 has in its bottom region a first catch opening 19 through which the locking element 18 is pressed radially outwardly by the spring 20 and engaged.

As FIG. 1 also shows, the telescopic tube 12 has in its longitudinal path at least one further catch opening 19a which corresponds to the fully-opened position of the corresponding engine bonnet or boot lid. As required, various intermediate locking positions may be provided.

In order to prevent the locking element 18 being pressed out of the carrier 16, it is provided with an inner snap element 25 which acts against a snap shoulder 26 and so limits the radial movement.

As shown in FIGS. 3 and 4, the carrier 16 comprises a guide projection 29 which is guided in the longitudinal groove 27 of the telescopic tube 12. The guide projection 29 thereby secures the carrier 16 against rotation and prevents rotating forces being transmitted to the locking element 18. The locking element 18 is thus guided freely from rotating forces and can be impressed into a recess 30 of the guide projection 29.

In order to be able to connect the carrier 16 to the gas-filled spring 11, as shown in FIG. 2, key surfaces 31 are provided which are opposite each other and which are offset by about 90° in respect of the guide projection 29. The key surfaces 31 are adapted to a corresponding tool by which a torque can be applied for screwing-up purposes.

In addition to the openings 19 and 19a, the telescopic tube 12 shown in FIG. 5 comprises spring tongues 32, such as are shown in detail in FIG. 6. The spring tongues 32 are provided by U-shaped stamped out parts 33 in the region of the open end 34 of the telescopic tube and are bent radially inwardly towards the cylinder 9. The spring tongues 32, when the gas-filled spring 11 is inserted, bear on the cylinder 9 and prevent a relative radial movement. Noise due to relative radial movements between the telescopic tube 12 and the cylinder 9 are thus avoided. In the case of the example of embodiment shown, two oppositely disposed spring tongues are shown but if necessary, however, it is also possible to provide a plurality of spring tongues which are distributed over the periphery. In another embodiment, it may be advantageous to provide a plurality of radially inwardly directed spring tongues 32 which are distributed over the length of the telescopic tube 12.

Figure 7:
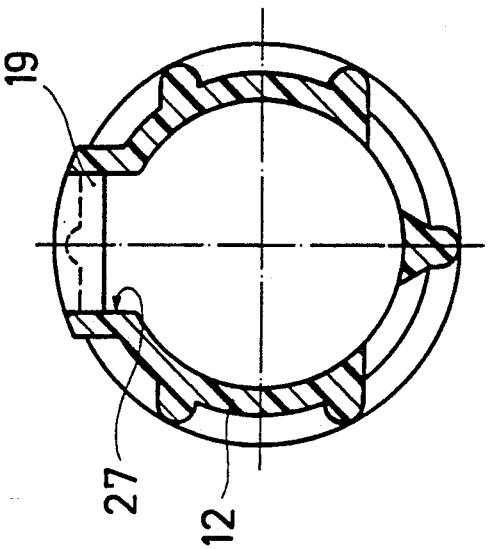
FIG. 7 shows a section through the telescopic tube according to line VII—VII of FIG. 5.

As FIG. 7 shows, the telescopic tube 12 is provided on the inside with a longitudinal groove 27 along which the locking element 18 slides. This locking element 18 is reliably guided in the longitudinal groove 27 by its guide projection 29 so that after release it reliably finds the next catch opening 19 or 19a and again engages securely by the pressure of the spring 20. This also prevents the cylinder 9 rotating in the telescopic tube 12 when the locking element 18 is released. An unintentional over-extension of the cylinder 9 out of the telescopic tube 12 is in this way reliably avoided.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A positioning device for positioning two relatively movable construction elements in respective relative positions, comprising:

a cylinder piston unit (11), including a cylinder member (9) and a piston rod member (13) extending axially through one end of said cylinder member (9);

a telescopic tube (12) having an open end and a closed end, said cylinder member (9) being axially received in said tube (12) through the open end thereof for axial movement relative to said tube (12);

first fastening means (15) on said telescopic tube (12) adjacent the closed end thereof for attachment to one of the construction elements to be positioned;

second fastening means (14) on said piston rod member (13) adjacent the free end thereof for attachment to the other of the elements to be positioned;

first locking means (19a) carried by said tube (12) in axially fixed relation thereto;

a carrier member (16), separate from said cylinder member (9), located within the tube (12) adjacent the other end of said cylinder member (9), said carrier member (16) being axially movable within said tube (12);

means (17, 17a) for connecting said carrier (16) member to said cylinder member (9) in axially fixed relation thereto and for axial movement with said cylinder member (9) relative to said tube (12);

second, releasable locking means (18, 20, 21, 22, 23) carried by said carrier member (16) for movement transversely of the longitudinal axis of the cylinder member (9) between a locked position, in which said second locking means is engaged with said first locking means (19a), and an unlocked position, in which said second locking means is disengaged from said first locking means (19a);

whereby relative movement between the cylinder member (9) and the telescopic tube (12) is permitted when said second locking means is in the unlocked position and prevented when said second locking means is in the locked position.

2. The positioning device of claim 1, wherein said first locking means (19a) is spaced lengthwise along said tube (12) from said closed end thereof in the direction of the open end thereof such that, when said first locking means (19a) is engaged by said second locking means, a portion of said cylinder member (9) extends out of the open end of said telescopic tube (12).

3. The positioning device of claim 1 further comprising:
third locking means (19) carried by said tube (12) in axially fixed relation thereto;
said third locking means (19) being spaced lengthwise along said tube (12) from said first locking means (19a) in the direction of the closed end of said tube (12).

4. The positioning device of claim 3, wherein:
said first and third locking means (19a, 19) are aligned axially of the length of said tube (12); and
said tube (12) includes means defining an axially-extending groove (27) in the radially inner face of the circumferential wall thereof and axially interconnecting said first and second locking means (19a, 19), said groove (27) being radially outwardly closed by the circumferential wall of said tube (12).

5. The positioning device of claim 4, wherein said carrier member (16) includes means (29) for axially-sliding engagement with the sidewalls of said groove (27) to guide said cylinder member (9) in axial non-rotational movement relative to said tube (12).

6. The positioning device of claim 4, wherein said first and third locking means comprise openings (19, 19a) extending through the circumferential wall of said tube (12).

7. The positioning device of claim 1, wherein said second locking means includes:
a locking element (18) mounted on said carrier member (16) for movement transversely of the longitudinal axis of said cylinder member (9) between said locked position and said unlocked position; and
means (20, 21, 23) for resiliently biasing said locking element (18) towards said locked position.

8. The positioning device of claim 7, wherein:
said carrier member (16) is composed of non-metallic plastic material; and
said cylinder piston unit (11) comprises a gas spring containing a gas under high pressure.

9. The positioning device of claim 8, wherein said locking element (18) is composed of non-metallic plastic material.

10. The positioning device of claim 1, wherein:
said tube (12) includes means defining an axially-extending groove (27) in the radially-inner face of the circumferential wall thereof, said groove (27) being radially-outwardly closed by the circumferential wall of said tube (12); and
said carrier member (16) includes a radially-extending projection (29) which is radially received within said groove (27) for axially-sliding engagement with the sidewalls of said groove to guide said cylinder member (9) in axial non-rotatable movement relative to said tube (12).

11. The positioning device of claim 10, wherein:
said second locking means includes a locking element (18) mounted on said carrier member (26) for movement transversely of the longitudinal axis of said cylinder member (9) between said locked position and said unlocked position; and
said locking element (18) having a smaller circumferential width than said projection (29) and being circumferentially located on said carrier member (16) relative to said projection (29) such that said projection (29) holds said locking element (18) out of engagement with the sidewalls of said groove (27), whereby said locking element (18) is not subject to rotational forces transmitted by said tube (12).

* * * * *